(12) United States Patent
Holemans et al.

(10) Patent No.: US 7,309,166 B2
(45) Date of Patent: Dec. 18, 2007

(54) HUB JOINT FOR TRANSFERRING LOAD FROM A ROTATING SHAFT TO A STATIONARY BODY

(75) Inventors: Peter Holemans, Sewell, NJ (US); Mark J. Robuck, Chadds Ford, PA (US); Pierre J. Minguet, Media, PA (US)

(73) Assignee: The Boeing Company, Chicago, IL (US)

( * ) Notice: Subject to any disclaimer, the term of this patent is extended or adjusted under 35 U.S.C. 154(b) by 222 days.

(21) Appl. No.: 11/240,246

(22) Filed: Sep. 30, 2005

(65) Prior Publication Data

US 2007/0248296 A1    Oct. 25, 2007

(51) Int. Cl.
*F16C 35/06* (2006.01)

(52) U.S. Cl. ...................... 384/571; 384/543

(58) Field of Classification Search ............... 384/571, 384/559, 584, 585, 544, 589, 543, 586; 416/244 R; 74/606 R See application file for complete search history.

(56) References Cited

U.S. PATENT DOCUMENTS

| 691,922 | A | * | 1/1902 | Whiteley et al. | ........... 384/589 |
|---|---|---|---|---|---|
| 1,344,524 | A | * | 6/1920 | Vervoort | ..................... 384/589 |
| 1,383,758 | A | * | 7/1921 | Robinson | .................... 384/589 |
| 4,427,242 | A | * | 1/1984 | Otto | ........................... 384/486 |
| 5,405,202 | A | * | 4/1995 | Chi | ............................. 384/545 |

* cited by examiner

*Primary Examiner*—Thomas R. Hannon
(74) *Attorney, Agent, or Firm*—Lee & Hayes, PLLC

(57) ABSTRACT

A hub joint for supporting bearings adapted to rotatably receive a shaft. The joint includes an upper annular portion having a radially inner boundary and an upper bearing mount attached to the inner boundary of the upper annular portion. The upper bearing mount has a radially inner surface forming a conical upper bearing seat. The joint further comprises a lower bearing mount attached to and positioned below the upper bearing mount. The lower bearing mount has a radially inner surface forming a conical lower bearing seat. The joint also comprises a lower annular portion having a radially inner boundary attached to the lower bearing mount.

20 Claims, 8 Drawing Sheets

US 7,309,166 B2

HUB JOINT FOR TRANSFERRING LOAD FROM A ROTATING SHAFT TO A STATIONARY BODY

This invention was made with government support under a grant from the U.S. Army (contract number DAAH10-01-2-0005). The U.S. government has certain rights in this invention.

BACKGROUND OF THE INVENTION

The present invention relates to a hub joint and, more particularly, to a hub joint for transferring load from a rotating shaft to a stationary body.

Conventional hub joints for heavy applications usually have a forged metal or metal alloy housing. For example, conventional rotorcraft transmission housings are often made of aluminum. Metal housings can be very heavy, often weighing between about 100 pounds and about 500 pounds. Many products having hub joints would benefit from having a lighter hub joint. For example, because aircraft are sensitive to weight, there is a need to design lighter joints for use in aircraft.

Three primary methods for reducing assembly are to use different materials, change the amount of material used, or both. Such changes must be made within strength specification for the assembly. Changing materials is especially challenging because various materials often have significantly different characteristics and, thus, often require considerable configuration changes. For example, although aluminum is nearly isotropic (i.e., having substantially the same material properties in all directions), many other materials, such as many composite materials are less homogenous, having different properties in different directions. A hub joint is needed that is considerably lighter than traditional hub joints but does not compromise strength and stiffness.

BRIEF SUMMARY OF THE INVENTION

The present invention relates to a hub joint for supporting bearings adapted to rotatably receive a shaft. The joint comprises an upper annular portion having a radially inner boundary and an upper bearing mount attached to the inner boundary of the upper annular portion. The upper bearing mount has a radially inner surface forming a conical upper bearing seat. The joint further comprises a lower bearing mount attached to and positioned below the upper bearing mount. The lower bearing mount has a radially inner surface forming a conical lower bearing seat. The joint also comprises a lower annular portion having a radially inner boundary attached to the lower bearing mount.

In another aspect, the present invention includes a joint for rotatably connecting a shaft to a body. The joint comprises a housing including an upper annular portion having a radially inner boundary and an upper surface. The housing further includes an upper bearing mount attached to the inner boundary of the upper annular portion and having a radially inner surface. The housing also includes a lower bearing mount attached to the upper bearing mount and a radially inner surface. In addition, the housing includes a lower annular portion having a radially inner boundary attached to the lower bearing mount and having a lower surface. The joint further comprises a bearing assembly including an outer race positioned adjacent one of the upper bearing seat and the lower bearing seat. The upper annular portion, the upper bearing mount, the lower bearing mount, and the lower annular portion each include a plurality of layers embedded in a matrix substantially parallel to the respective surface and the housing is configured for being connecting to the body.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

Figure 1:
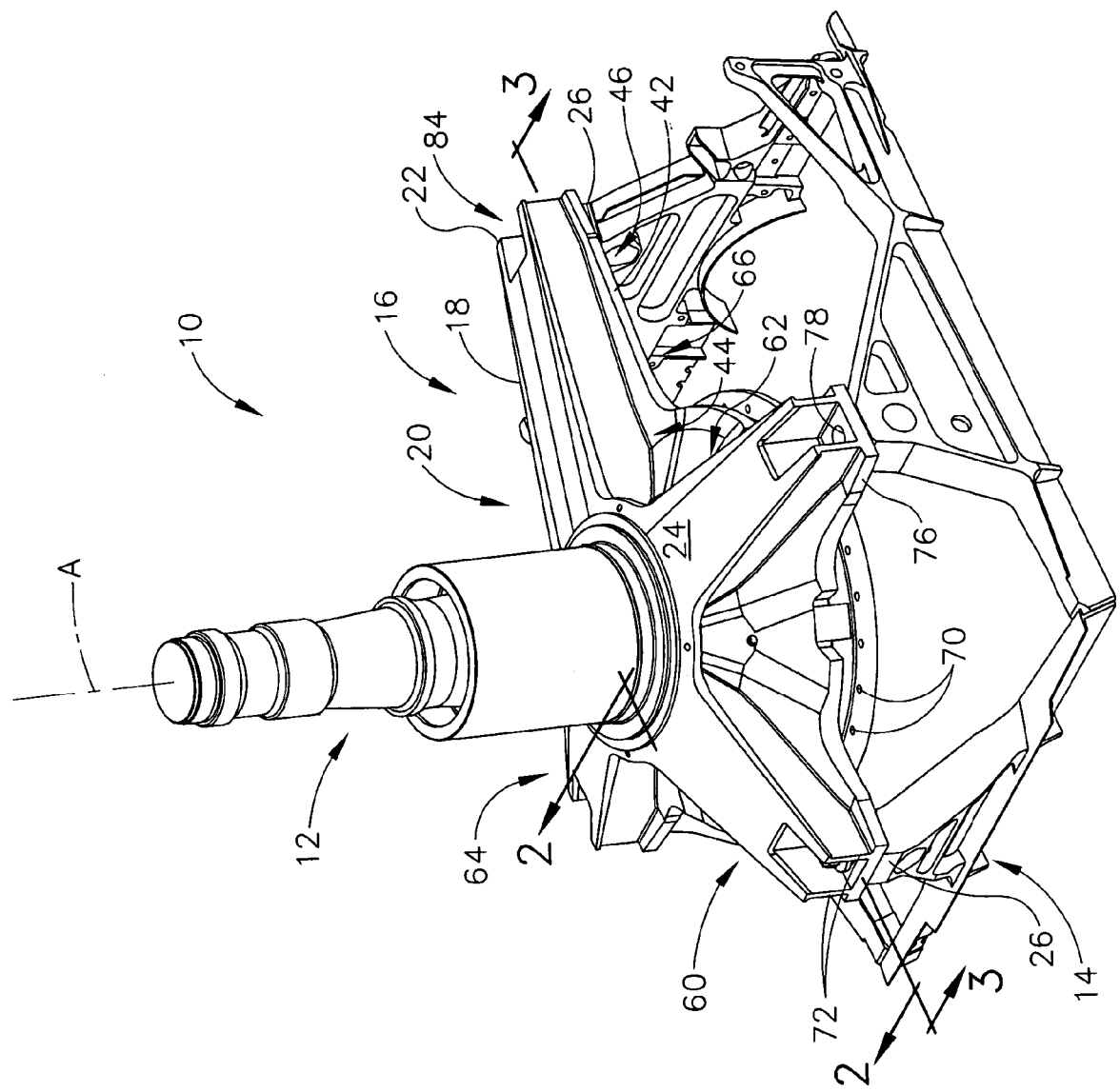
FIG. 1 is a perspective of a hub joint according to the present invention shown in combination with a shaft and a body.

Referring to the figures, and more particularly to FIG. 1, a hub joint according to a first embodiment of the present invention is designated in its entirety by reference number 10. The joint 10 is used for rotatably connecting a shaft, generally designated by 12, to a body, generally designated by 14, of a product. The joint 10 may be used in products such as aircraft and other vehicles. The joint 10 comprises a housing, generally designated by 16, having an upper annular portion 18. The upper annular portion 18 has a radially inner boundary 20, an outer periphery 22, and an upper surface 24 extending between the inner boundary and the outer periphery. The upper annular portion has an overall length and width that complement the mounts 26 on the body. These dimensions depend on variables including space requirements of the product and loads the joint will be expected to transmit. Although the housing 16 may include other materials without departing from the scope of the present invention, in one embodiment the housing is at least partially formed from a polymer based composite. For example, the housing 16 may include carbon fibers (shown in FIG. 8) embedded and cured into a matrix of resin, such as a bismaleimide (BMI) resin.

Figures 2, 6:
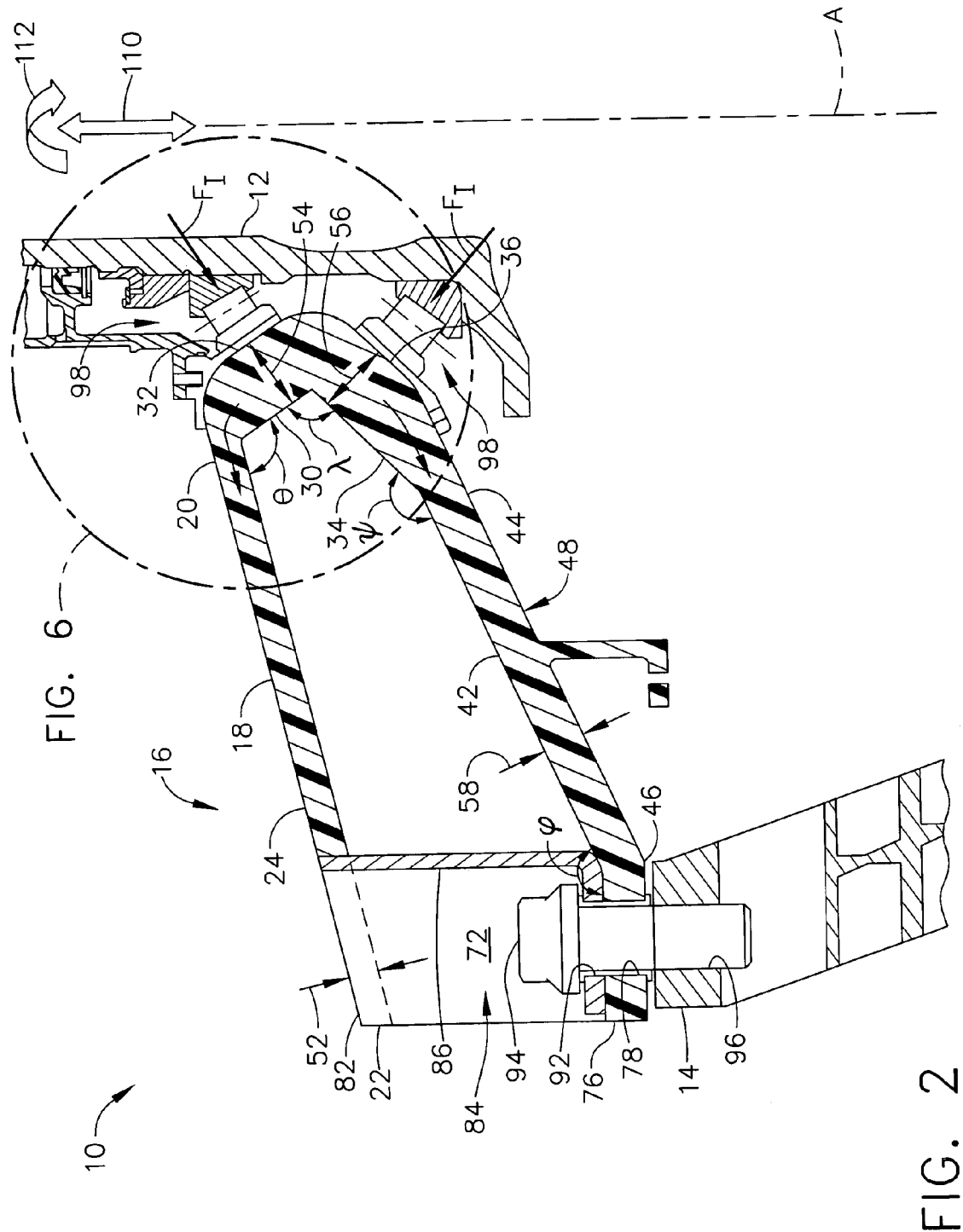
FIG. 2 is a cross section of the joint taken along line 2-2 of FIG. 1.
FIG. 6 is a detail of the joint as in FIG. 2.

As shown in FIG. 2, the housing 16 also includes an upper bearing mount 30 attached to the inner boundary 20 of the upper annular portion 18. In one embodiment, the upper bearing mount 30 is directly attached to the inner boundary 20 of the upper annular portion 18. Further, the upper bearing mount 30 is angled relative to the upper annular portion 18. Although the upper annular portion 18 and the upper bearing mount 30 may be separated by other angles θ, in one embodiment the upper annular portion and the upper bearing mount are separated by an angle of between about 70° and about 80°. The upper bearing mount 30 has a radially inner surface 32 forming a conical upper bearing seat. That is, the radially inner surface 32 of the upper bearing mount 30 is the conical upper bearing seat.

Figure 3:
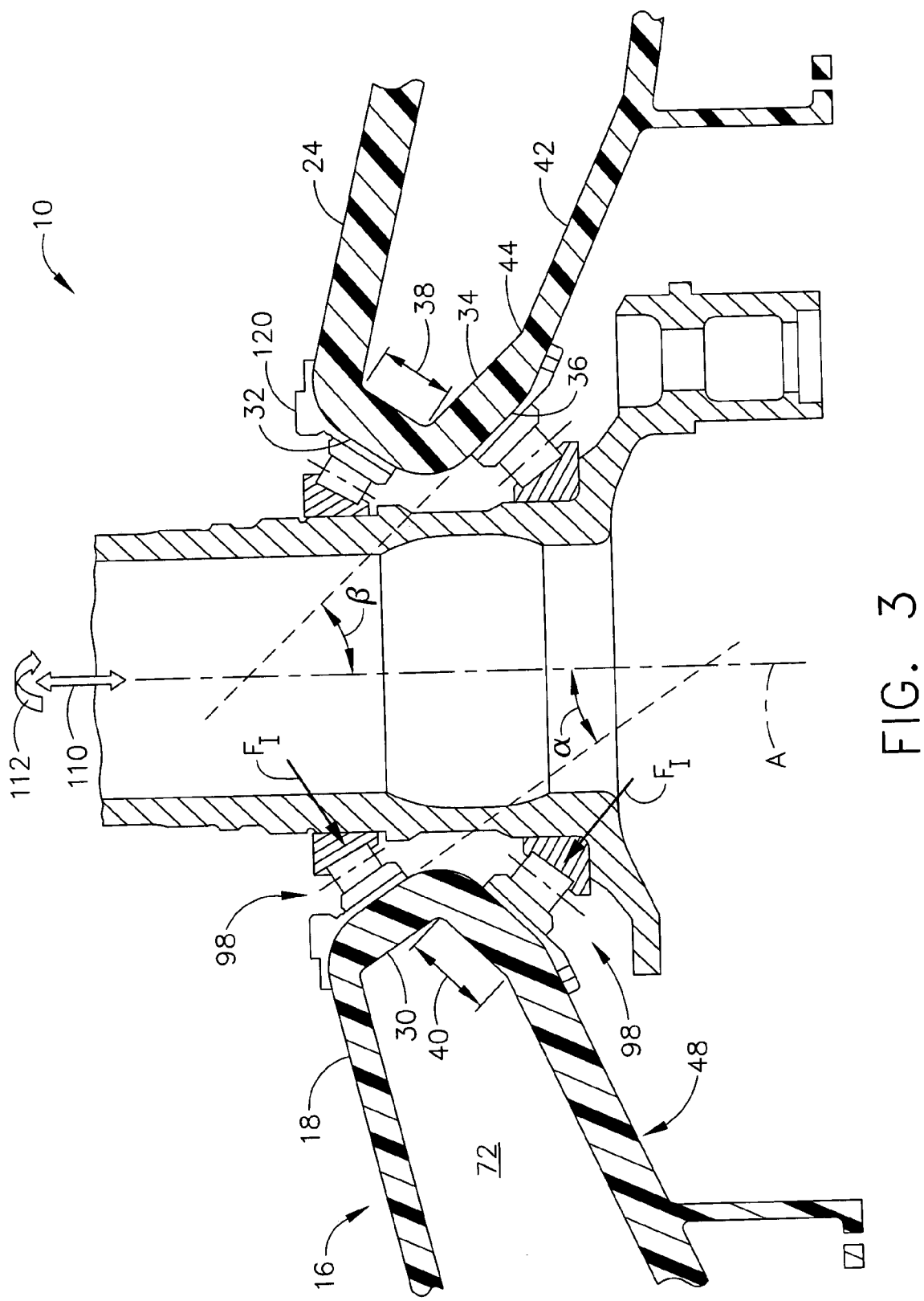
FIG. 3 is a cross section of the joint taken along line 3-3 of FIG. 1.

The housing 16 also includes a lower bearing mount 34 attached to and positioned below the upper bearing mount 30. The lower bearing mount 34 has a radially inner surface 36 forming a conical lower bearing seat. That is, the radially inner surface 36 of the lower bearing mount 34 is the conical lower bearing seat. As shown in FIGS. 2 and 3, the upper bearing mount 30, the lower bearing mount 34 and the shaft 12 are concentric and share a common axis A. As shown in FIG. 3, the inner surface 32 of the upper bearing mount 30 has a conical shape and the inner surface 46 of the lower bearing mount 34 has a conical shape. In one embodiment, the bearing mounts 30, 34 are directly attached and meet at an angle λ. Although the upper bearing mount 30 and the lower bearing mount 34 may be separated by other angles λ, in one embodiment the upper and lower bearing mounts are separated by an angle of between about 75° and about 80°. Although the radially inner surface 32 of the upper bearing mount 30 may be separated from the common axis A by other angles α, in one embodiment the surface is separated from the axis A by an angle of between about 50° and about 60°. Further, although the radially inner surface 36 of the lower bearing mount 34 may be separated from the common axis A by other angles β, in one embodiment the surface is separated from the axis A by an angle of between about 45° and about 55°. Although the inner surface 32 of the upper bearing mount 30 may have other widths 38 (FIG. 3), in one embodiment the surface has a width of between about 1 inch and about 2.5 inches. Although the inner surface 36 of the lower bearing mount 32 may have other widths 40 (FIG. 3), in one embodiment the surface has a width of between about 2.5 inches and about 3.5 inches.

As further illustrated in FIG. 2, the housing 16 includes a lower annular portion 42 having a radially inner boundary 44 attached to the lower bearing mount 34. The lower annular portion 42 also has an outer periphery 46 and a lower surface 48. The lower annular portion 42 has an overall length and width that complement the mounts 26 on the body. The inner boundary 44 of the lower annular portion 42 may be directly attached to the lower bearing mount 34. Although the lower bearing mount 34 and the lower annular portion 42 may be separated by other angles ψ, in one embodiment the lower bearing mount and the lower annular portion are separated by an angle of between about 75° and about 85°. In one embodiment, the upper annular portion 18, the upper bearing mount 30, the lower bearing mount 34, and the lower annular portion 42 are integrally formed. The upper annular portion 18, the upper bearing mount 30, the lower bearing mount 34, lower annular portion 42 each have thicknesses 52, 54, 56, 58, respectively. In one embodiment, the upper annular portion 18 has a thickness 52 of between about 0.25 inches and about 0.75 inches, the upper bearing mount 30 has a thickness 54 of between about 1 inch and about 1.2 inches, the lower bearing mount 34 has a thickness 56 of between about 1 inch and about 1.2 inches, and the lower annular portion 42 has a thickness 58 of between about 1.1 inches and about 1.3 inches. The thicknesses 52, 54, 56, 58 may vary, such as tapering from one end of the respective mount 30, 34 or portion 18, 42 to the other.

Figure 4:
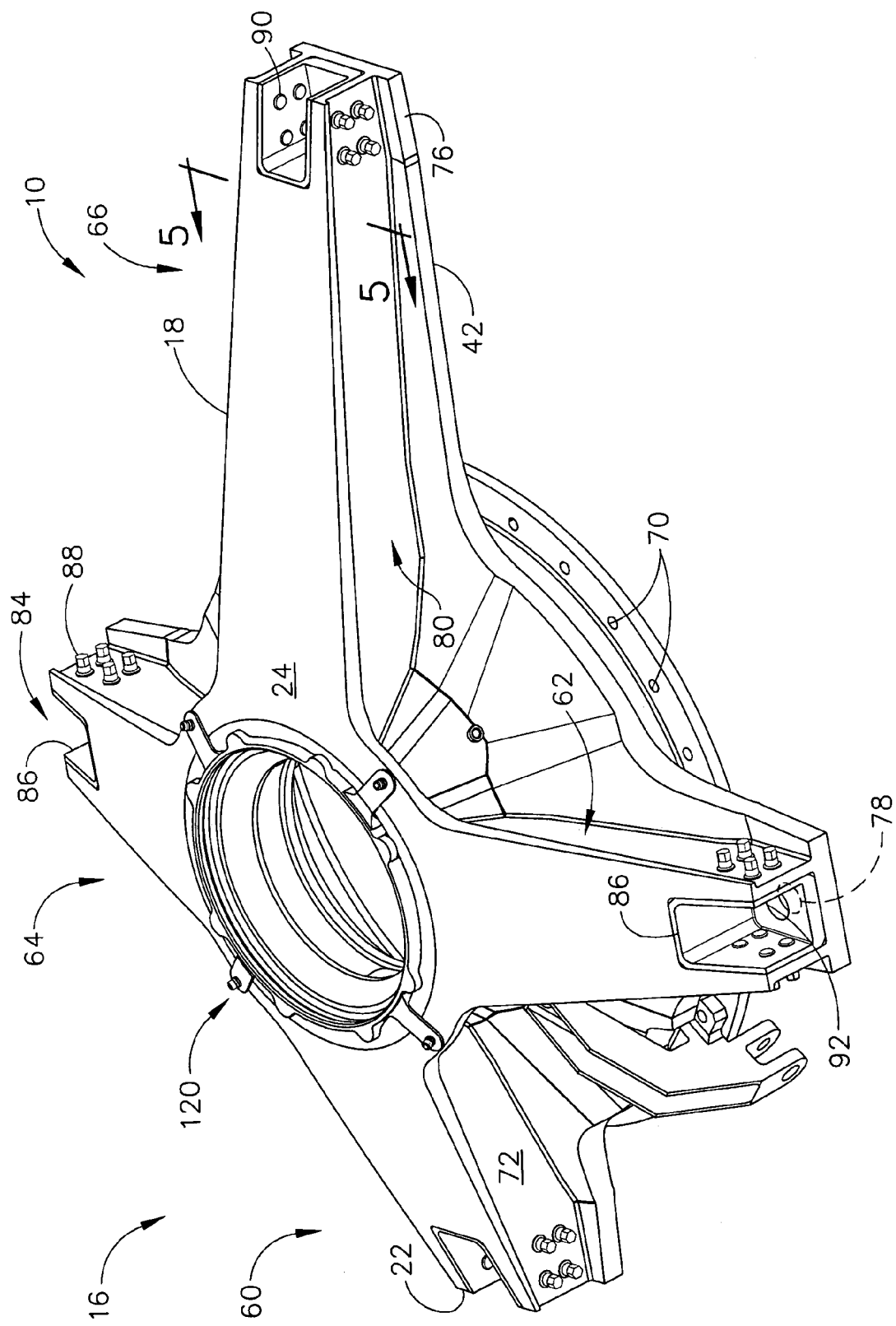
FIG. 4 is a perspective of a housing of the joint shown with a bearing assembly liner mounted thereon.

As shown in FIGS. 1 and 4, the upper annular portion 18 and the lower annular portion 42 include a plurality of radial extensions 60, 62, 64, 66. The extensions 60, 62, 64, 66 may have different lengths. For example, in the embodiment shown in FIG. 4, which is a joint 10 for a helicopter, one extension 66 is longer and extends rearward from the joint when mounted on the helicopter. A series of holes 70 may be provided in the lower annular portion 42 adjacent its outer periphery 46 for connecting the housing 16 to the body 14.

Figure 5:
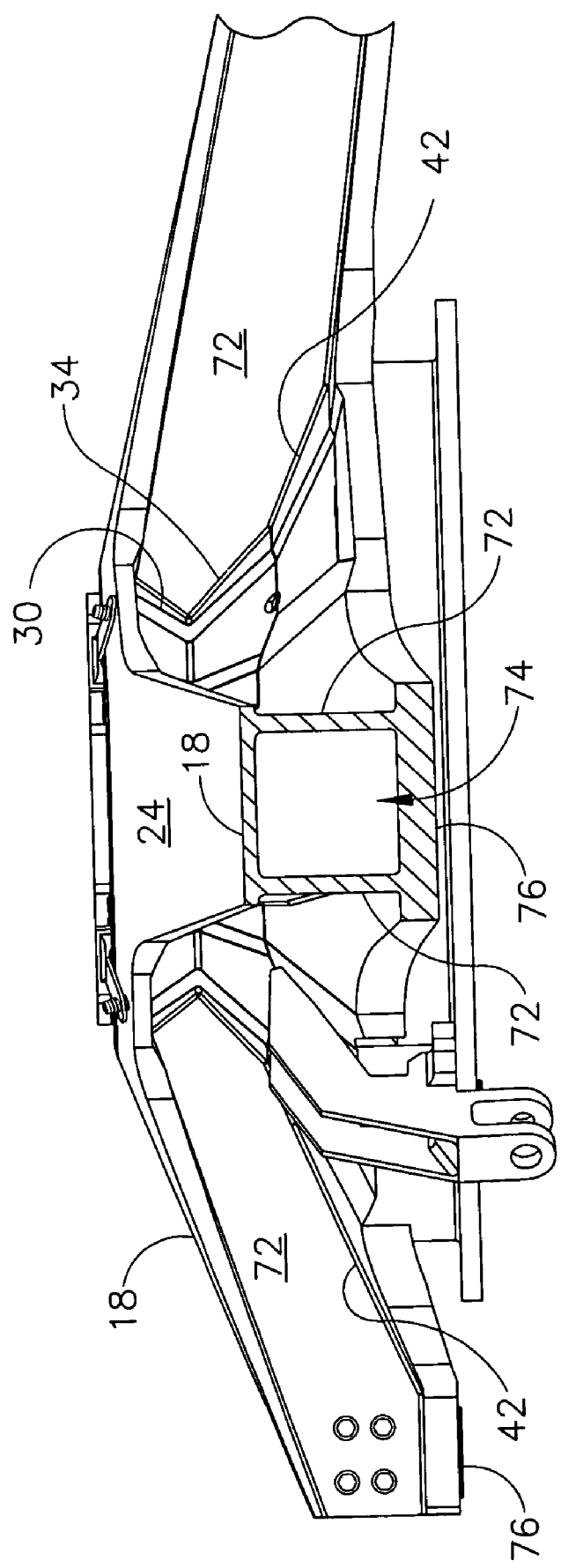
FIG. 5 is a cross section of the joint taken along line 5-5 of FIG. 4.
Figure 6:
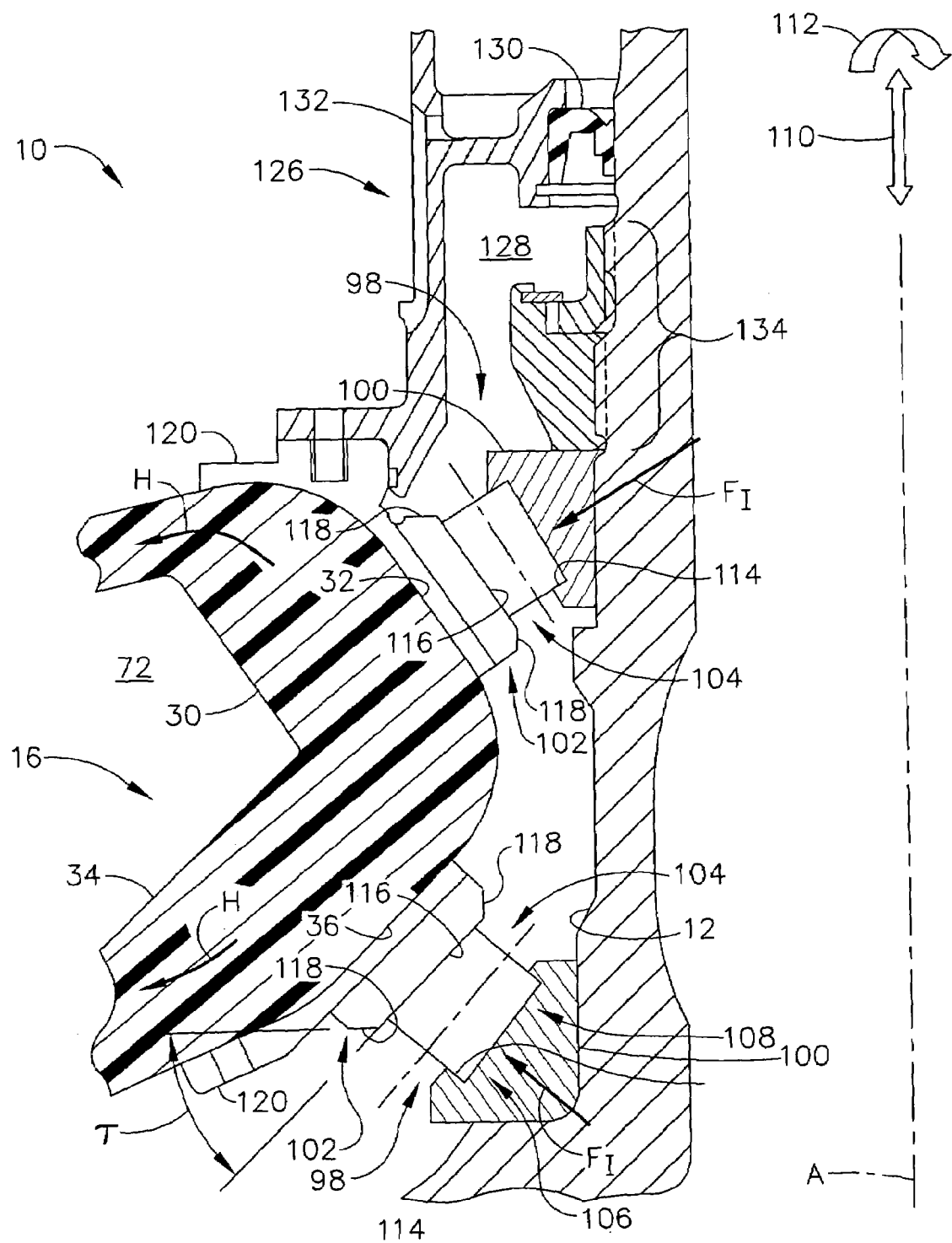

The extensions 60, 62, 64, 66 include opposing sides 72 connecting the upper annular portion 18 to the lower annular portion 42. Although the extensions 60, 62, 64, 66 may have other configurations without departing from the scope of the present invention, in one embodiment illustrated in FIG. 5, each extension is hollow.

As illustrated in FIG. 2, the housing 16 further includes a foot 76 connected directly to the lower annular portion 42. Although the foot 76 and the lower annular portion 42 may be separated by other angles φ, in one embodiment the foot and the lower annular portion are separated by an angle of between about 165° and about 175°. The foot 76 may include a hole 78 for use in connecting the housing 16 to the body 14. As shown in FIG. 4, the opposing sides 72 extend radially to the outer periphery 22 of the upper annular portion 18 to support the corresponding foot 76. Thus the sides 72 and feet 76 form cavities 84. A fitting 86 having a shape corresponding to a shape of the cavity 84 may be positioned in each cavity. The fitting 86 connects the outer periphery 22 of the upper annular portion 18, the outer periphery 46 of the lower annular portion 42, the foot 76, and the sides 72 to each other when positioned in the cavity 84. Although the fitting 86 may be made of other materials without departing from the scope of the present invention, in one embodiment the fitting is made of metal. In another embodiment, the fittings 86 is made of a composite material. The fittings 86 may be secured to the housing 16 in various ways. For example, as shown in FIG. 4, the fittings 86 may be secured to the housing 16 by fasteners 88 that extend through the sides 72 and into nuts 90 embedded in the fittings. In one embodiment, the fittings 86 are adhesively bonded to the housing 16. The fitting 86 has a hole 92 corresponding to the hole 78 in the foot 76. As shown in FIG. 2, a threaded fastener 94 is inserted through the aligned holes 70, 92 and into a socket 96 of the body 14 to connect the housing 16 to the body.

As shown in FIG. 6, the hub joint 10 further comprises one or more bearing assemblies 98. As shown in FIG. 6, each bearing assembly 98 includes an inner race 100 secured to the shaft 12. The bearing assemblies 98 further include outer races 102 positioned adjacent the corresponding bearing seat 32, 36. Although the races 100, 102 may be made of other materials without departing from the scope of the present invention, in one embodiment the races are made of metal, such as high carbon steel. Each bearing assembly 98 further includes a plurality of bearings 104 positioned between each set of inner and outer races 100, 102 thereby permitting the inner race to rotate relative to the outer race. Various types of bearings 104 may be used. For example, as shown in FIG. 6, each bearing 104 may be a tapered roller bearing, having a diameter at a first end 106 of the bearing that is larger than a diameter at a second end 108 of the bearing. The bearings 104 roll on the inner races 100, which distribute incident forces or loads $F_i$ resulting from vertical shaft loads 110 and/or bending shaft loads 112 transferred to the bearings 104. The bearings 104 also roll on the outer races 102, which distribute the loads $F_i$ received from the shaft 12 by way of the inner race 100 and bearings to the housing 16.

As shown in FIG. 6, the inner race 100 may have a recess 114 for receiving and securing the bearing 104. Each bearing assembly 98 may also include a conventional bearing cage (not shown) rotatably connected to each bearing 104. Each outer race 102 may have a bearing surface 116 adjacent the bearings 104 and two pitched surfaces 118 extending from the bearing surface toward the corresponding bearing seat 32, 36. Although each bearing surface 116 may be separated from the corresponding pitched surfaces 118 by other angles τ, in one embodiment each bearing surface is separated from each corresponding pitched surface by an angle of between about 30° and about 60°.

Figure 7:
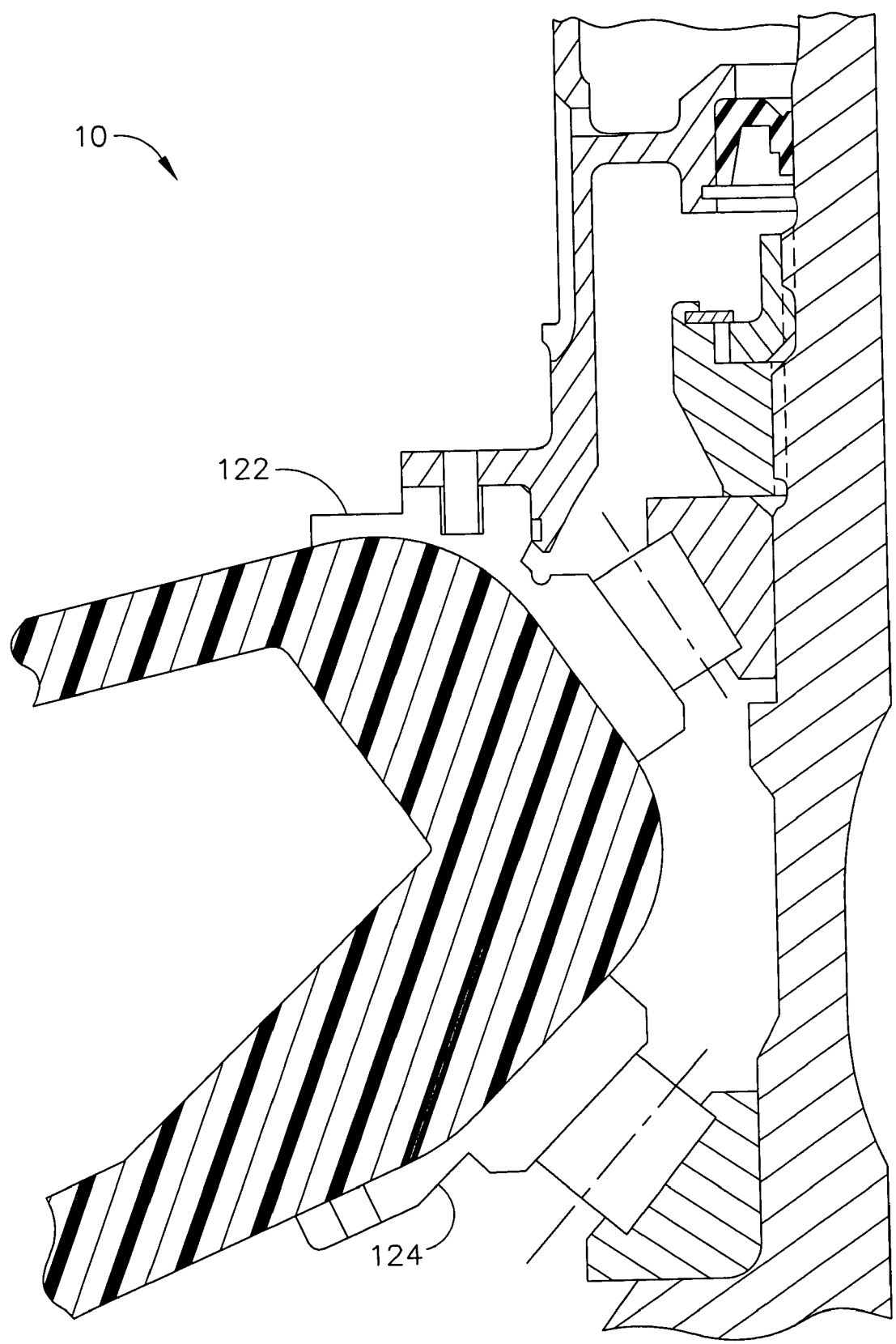
FIG. 7 is a cross section of the joint having a combined race/liner.

The bearing assemblies 98 may also include an annular distributor or liner 120 positioned adjacent and between each outer race 102 and the corresponding bearing seat 32, 36 to further for distribute forces from the outer races to the bearing seats. FIG. 6 shows the upper liner 120 positioned directly adjacent the upper bearing mounts 30, 34 and the upper annular portion 18 of the housing 16. Although the liner 120 may be made of other materials without departing from the scope of the present invention, in one embodiment the liner is made of metal, such as aluminum. Each outer race 102 and corresponding liner 120 pair may be replaced by a combined unitary structure. For example, FIG. 7 shows the joint 10 having combined upper and lower races/liners 122, 124. The combined race/liners 122, 124 may have the same function and external shape as the races 102 and liners 120 shown in FIG. 6. The combined race/liners 122, 124 may be made of various materials, such as high carbon steel.

The bearing assemblies 98 may be sealed. For example, as shown in FIG. 6, the bearing assemblies 98 may include one or more sealing structures 126 creating a sealed area 128 in which the bearings 104 operate. The sealing structure 126 may include a flexible lip 130 sealing engaged with the shaft 12 and a frame 132 attached to the housing 16. A conventional lubricant, such as oil, may be placed in the sealed area 128 to lubricate the bearing assemblies 98 and the same of another conventional lubricant, such as grease, may be placed between the lip 130 and the shaft 12. The bearing assemblies 98 may also include a tightening mechanism 134. In one embodiment the tightening mechanism 134 includes a lock nut and a lock washer (not shown in detail). The tightening mechanism 134 can be adjusted to bias the upper inner races 100 toward the lower inner races thereby clamping the bearings 104 between the upper and lower races. This clamping or collet arrangement retains the bearings 104 in place and preloads the bearings. The preloaded bearings 104 in turn apply a preload to the outer races 102 and the housing 16. The preloads from the bearings 104 result in hoop stresses H in the housing 16.

Figure 8:
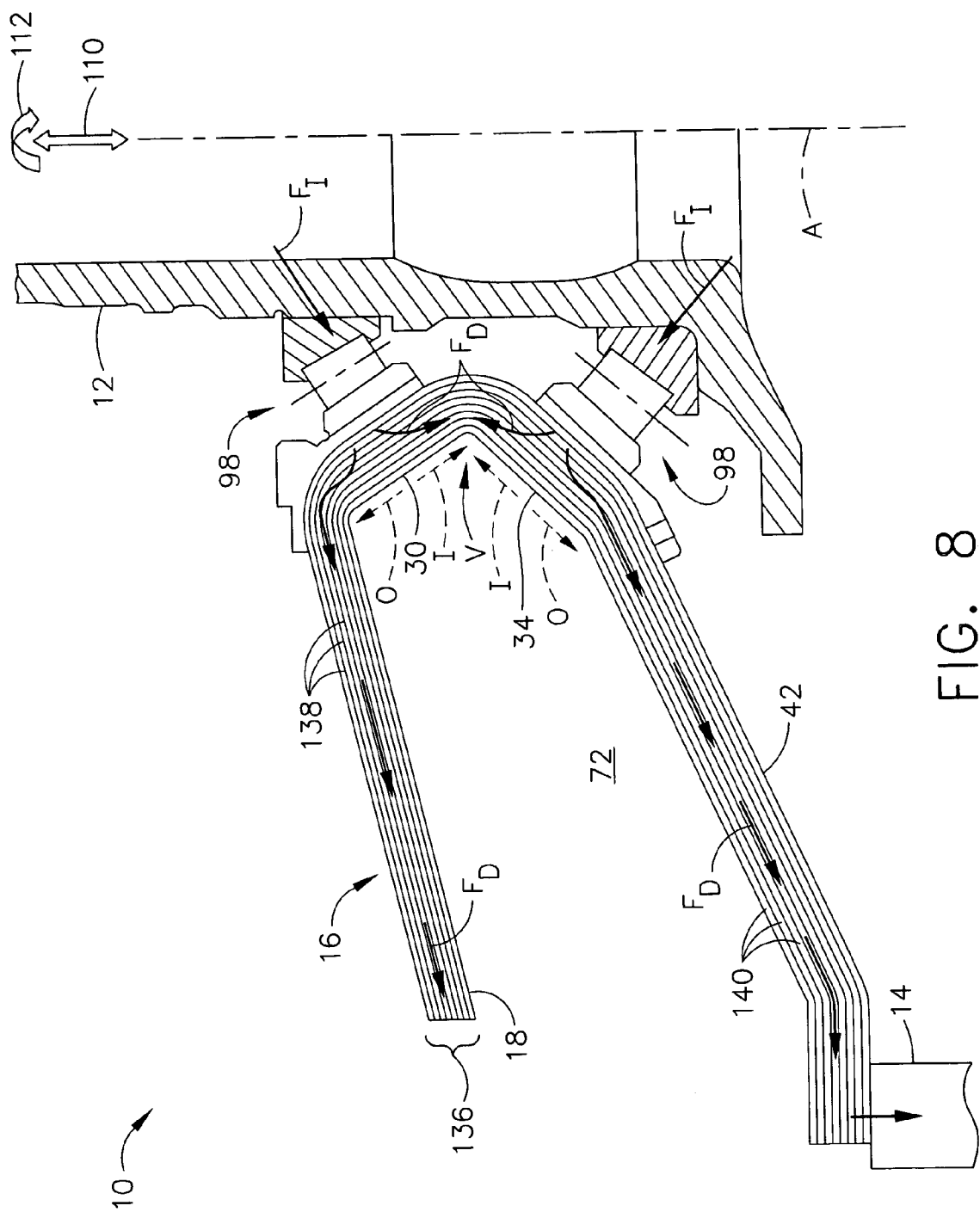
FIG. 8 is a cross section of the joint showing the composite layers of the housing.

FIG. 8 shows the multiple layers 136 making up the housing 16 when the housing is made of a composite. The layers 134 may include plies 138 of carbon fiber, as described above, embedded in a polymer resin matrix 140. In one embodiment, the layers 136 are substantially parallel to the adjacent respective outer surface 24, 32, 40, 48, of the housing 16. The incident forces $F_i$ received by the housing 16 from the shaft 12 by way of the bearing assemblies 98 result in distributed forces $F_D$ through the housing. The distributed forces $F_D$ primarily translate through the housing 16 substantially parallel to the composite layers 136. As shown in FIG. 8, the forces $F_D$ transmitted from the outer race 102 are first distributed into the bearing mounts 30, 34 and inward, indicated by arrow "I", and outward, indicated by arrow "O", along the mounts. Point loads to the housing are avoided because, among other reasons, the bearing mounts 30, 34, including their inner surfaces 20, 40, are generally linear instead of having multidirectional portions (e.g., a vertical portion connected to a horizontal portion). Bearing seats having multiple portions cause point loads at junctions between the portions. Interlaminar stresses within the composite are reduced because, among other reasons, the races 100, 102 and liner 120, or the combined race/liners 122, 124, distribute the incident forces $F_i$ into the housing 16. The forces $F_D$ distributed inward "I" meet at a vertex V of the upper bearing mount 30 and the lower bearing mount 34. As will be appreciated by those skilled in the art, the forces $F_D$ meeting at the vertex V counter each other. In this way, the upper bearing mount 30 and the lower bearing mount 34 provide edge reinforcement to each other. The forces $F_D$ distributed outward "O" are subsequently transmitted from the bearing mounts 30, 34 to the corresponding annular portions 18, 42. Although forces $F_D$ will be transmitted in other directions through the housing 16, the forces are primarily distributed through the housing in the direction generally parallel to the direction of the composite layers 136, as shown in FIG. 8. Force $F_D$ distributions in this manner are ideal because the housing 16 can support the largest loads in the direction parallel to its layers 136.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A hub joint for supporting bearings adapted to rotatably receive a shaft, said joint comprising:
   an upper annular portion having a radially inner boundary;
   an upper bearing mount attached to the inner boundary of the upper annular portion, said upper bearing mount having a radially inner surface forming a conical upper bearing seat;
   a lower bearing mount attached to and positioned below the upper bearing mount, said lower bearing mount having a radially inner surface forming a conical lower bearing seat; and
   a lower annular portion having a radially inner boundary attached to the lower bearing mount; and
   a plurality of legs extending radially to an outer periphery of said upper annular portion.

2. A joint as set forth in claim 1 wherein the upper annular portion, the upper bearing mount, the lower bearing mount and the lower annular portion are integrally formed.

3. A joint as set forth in claim 1 wherein: the upper bearing mount is directly attached to the inner boundary of the upper annular portion; the lower bearing mount is directly attached to the upper bearing mount; and the inner boundary of the lower annular portion is directly attached to the lower bearing mount.

4. A joint as set forth in claim 1 at least partially formed from a polymer based composite.

5. A joint as set forth in claim 1 wherein: the upper annular portion has an outer periphery; the lower annular portion has an outer periphery; and joint further comprises a fitting connecting the outer periphery of the upper annular portion to the outer periphery of the lower annular portion.

6. A joint as set forth in claim 1 further comprising a foot connected directly to said lower annular portion.

7. A joint as set forth in claim 1 wherein the upper bearing mount and the lower bearing mount have a common axis and connect at a vertex.

8. A joint as set forth in claim 1 wherein each leg includes opposing sides connected to said lower annular portion.

9. A joint as set forth in claim 1 further comprising a bearing assembly including an outer race positioned adjacent one of said upper bearing seat and said lower bearing seat, an inner race, and a plurality of bearings positioned between said outer race and said inner race thereby permitting said inner race to rotate relative to said outer race.

10. A joint as set forth in claim 9 wherein said outer race has a bearing surface adjacent said bearings and two pitched surfaces extending from the bearing surface toward the corresponding bearing seat and wherein angles between the bearing surface and each corresponding pitched surface are each between about 30 degrees and about 60 degrees.

11. A joint as set forth in claim 10 further comprising: a liner positioned between the outer race and the corresponding bearing seat.

12. A joint as set forth in claim 10 wherein each bearing is a tapered roller bearing.

13. A hub joint for supporting bearings adapted to rotatably receive a shaft, said joint comprising:
   an upper annular portion having a radially inner boundary;
   an upper bearing mount attached to the inner boundary of the upper annular portion, said upper bearing mount having a radially inner surface forming a conical upper bearing seat;
   a lower bearing mount attached to and positioned below the upper bearing mount, said lower bearing mount having a radially inner surface forming a conical lower bearing seat; wherein the upper bearing mount and the lower bearing mount have a common axis and connect at a vertex; and
   a lower annular portion having a radially inner boundary attached to the lower bearing mount.

14. A joint as set forth in claim 13 wherein the upper annular portion, the upper bearing mount, the lower bearing mount and the lower annular portion are integrally formed.

15. A joint as set forth in claim 13 wherein:
   the upper bearing mount is directly attached to the inner boundary of the upper annular portion;
   the lower bearing mount is directly attached to the upper bearing mount; and
   the inner boundary of the lower annular portion is directly attached to the lower bearing mount.

16. A joint as set forth in claim 13 at least partially formed from a polymer based composite.

17. A joint as set forth in claim 13 further comprising a bearing assembly including an outer race positioned adjacent one of said upper bearing seat and said lower bearing seat, an inner race, and a plurality of bearings positioned between said outer race and said inner race thereby permitting said inner race to rotate relative to said outer race.

18. A joint for rotatably connecting a shaft to a body, the joint comprising:
   a housing including:
      an upper annular portion having a radially inner boundary and an upper surface;
      an upper bearing mount attached to the inner boundary of the upper annular portion, said upper bearing mount having a radially inner surface;
      a lower bearing mount attached to the upper bearing mount and having a radially inner surface; and
      a lower annular portion having a radially inner boundary attached to the lower bearing mount and having a lower surface; and a bearing assembly including:
      an outer race positioned adjacent one of said upper bearing seat and said lower bearing seat;
   wherein the upper annular portion, said upper bearing mount, said lower bearing mount, and said lower annular portion each include a plurality of layers embedded in a matrix substantially parallel to the respective surface; and
   wherein said housing is configured for being connecting to said body.

19. A joint as set forth in claim 18 further comprising:
   an inner race attached to said shaft; and
   a plurality of bearings positioned between said outer race and said inner race thereby permitting said inner race to rotate relative to said outer race and transferring forces from the shaft to the housing;
   wherein said forces result in loads being directed through the upper annular portion and lower annular portion in a direction parallel to said layers.

20. A joint as set forth in claim 18 wherein said layers include carbon and said matrix includes polymer resin.

* * * * *